United States Patent Office 3,509,086
Patented Apr. 28, 1970

3,509,086
EPOXY ACRYLIC SEALER COMPOSITIONS
Frank Rohrbacher, Jr., Flint, Mich., assignor to E. I. du Pont de Nemours and Company, Wilmington, Del., a corporation of Delaware
No Drawing. Continuation-in-part of application Ser. No. 650,197, June 30, 1967. This application May 12, 1969, Ser. No. 823,940
Int. Cl. C08f 45/34; C08g 45/04, 51/34
U.S. Cl. 260—32.8          18 Claims

ABSTRACT OF THE DISCLOSURE

Sealer compositions comprising polymeric binders dissolved in organic solvents wherein the polymeric binder comprises:

(A) 50–95 parts of a high molecular weight epoxy resin; and
(B) 5–50 parts of an adhesion-promoting acrylic polymer, the sum of said components being equal to 100 weight parts. These compositions are useful for bonding organic coatings such as methyl methacrylate to organic and metallic substrates.

CROSS-REFERENCE TO RELATED APPLICATION

This application is a continuation-in-part of U.S. application Ser. No. 650,197, filed June 30, 1967, and now abandoned.

BACKGROUND OF THE INVENTION

This invention relates broadly to film-forming compositions and more particularly to sealer compositions.

Although sealer compositions are well known in the prior art, previously it has been difficult or impossible to provide a sealer composition which retained its chip-resistance properties over broad temperature ranges and particularly at low temperatures of around 0° F. Chip-resistance is the ability of a finish coating to withstand impact without chipping away from the substrate. In the automotive industry, this is particularly a problem because of the chipping away of automobile finishes caused by the frequent impacts from road pebbles, etc.

SUMMARY OF THE INVENTION

According to this invention, there is now provided a sealer composition which comprises a polymeric binder dissolved in an organic solvent, the polymeric binder comprising the following components:

(A) about 50 to about 95 parts by weight of a high molecular weight epoxy resin; and
(B) about 5 to about 50 parts by weight of an adhesion-promoting acrylic polymer.

The sum of the high molecular weight epoxy resin and the adhesion-promoting acrylic polymer is always equal to 100 parts by weight.

One advantage of the sealer compositions of this invention is that they provide excellent chip resistance for coatings applied to substrates over wide temperature variations. Another advantage is that the sealer compositions of this invention provide in general stronger bonds than prior art compositions between the substrate and coating they are joining. The sealer compositions of this invention also exhibit improved corrosion resistance properties over the compositions of the prior art.

DESCRIPTION OF THE INVENTION

The epoxy resins useful for the sealer compositions of this invention are high in molecular weight. In general, they have the structural formula,

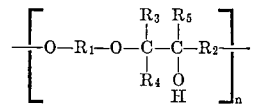

wherein, $n$ is an integer sufficient to provide the epoxy resin with a molecular weight of at least about 20,000,
$R_1$ is a divalent aromatic radical selected from the group of bisphenol A, substituted bisphenol A, bisphenol F and substituted bisphenol F,
$R_2$ is a $C_1$ to $C_5$ alkyl, and
$R_3$, $R_4$ and $R_5$ are individually selected from the group of hydrogen and a $C_1$ to $C_5$ alkyl.

$R_1$, as shown above, can be a bisphenol A or a bisphenol F, both of which can be substituted. Suitable substituents include $C_1$ to $C_5$ alkyls, halogens such as chlorine, bromine, and fluorine, and $C_1$ to $C_5$ alkoxy groups.

The preferred epoxy resin is epichlorohydrin-bisphenol A which has the structural formula,

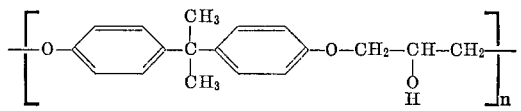

where $n$ is the same as above. Epichlorohydrin-bisphenol A is preferred because it readily forms films which have a balance of desired physical properties such as high tensile strength, toughness, good elongation, does not become brittle at low temperatures, and has good chemical resistance. Epichlorohydrin-bisphenol A polymers suitable for use with this invention are commercially available from (1) Dow Chemical Co., (2) Union Carbide Corp., (3) Shell Chemical Co., under the respective trademarks or trade names: (a) "D.E.R." 686–EK40 Epoxy Resin, "D.E.R." 684–EK40 Epoxy Resin, "CX-7090" Low Molecular Weight Epoxy Resin; (b) "Phenoxy" PKHH; and (c) "Eponol" 55–B40.

Another very useful high molecular weight epoxy resin is epichlorohydrin-bisphenol F which has the structural formula,

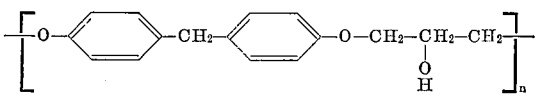

wherein $n$ is as defined above.

Epoxy resins used with this invention must be high enough in molecular weight so that the films formed are flexible and non-brittle; molecular weights of about 20,000 are generally sufficient. Higher molecular weights are preferred up to and beyond 200,000. It is understood, however, that epoxy resins having molecular weights as low as 15,000 can be used in some embodiments of this invention.

The high molecular weight epoxy resins constitute from about 50 to about 95% of the polymeric binder; the balance being the acrylic polymer. Amounts lower than 50% usually do not sufficiently retain the tough physical and chemical properties exhibited by high molecular weight epoxies. Amounts in excess of 95% usually do not exhibit the high amount of adhesion gained by increasing the amount of acrylic.

Acrylic polymers useful for this invention must be adhesion-promoting. The adhesion-promoting qualities are gained by the incorporation in the polymer chain of monomeric units which cause the polymer resin to exhibit good adhesion properties towards a substrate such as an alkyd resin.

The following examples are adhesion-promoting acrylic polymers suitable for use with this invention:

97/3–99/1 copolymer of methyl methacrylate/hydroxy amino propyl methacrylate;
75/25–99/1 copolymer of methyl methacrylate/3-(2-methacryloxyethyl)-2,2-spirocyclohexyl oxazolidine;
95/3/2 terpolymer of methyl methacrylate/methacrylic acid/3-amino 3-hydroxy propyl methacrylate;
50/50–99/1 copolymer of methyl methacrylate/diethyl amino ethyl methacrylate;
76/16/8 terpolymer of methyl methacrylate/butyl methacrylate/amino ethyl vinyl ether;
75/25–99/1 copolymer of methyl methacrylate/amino ethyl vinyl ether;
75/25–99/1 copolymer of methyl methacrylate/2-amino propyl methacrylate;
75/25–99/1 copolymer of methyl methacrylate/2-amino ethyl methacrylate;
50/50–99/1 copolymer of methyl methacrylate/2-(1-aziridinyl)-ethyl methacrylate;
50/50–99/1 copolymer of methyl methacrylate/t-butyl amino ethyl methacrylate;
50/50–99/1 copolymer of methyl methacrylate/dimethyl amino ethyl methacrylate;
90/10–99/1 copolymer of methyl methacrylate/N-2-hydroxy propyl methacrylamide;
90/10–99/1 copolymer of methyl methacrylate/N-2-hydroxy ethyl methacrylamide;
84/15/1 terpolymer of methyl methacrylate/3-(2-methacryloxyethyl)-2,2-spirocyclohexyl oxazolidine/t-butyl amino ethyl methacrylate;
80/14/5/1 four component polymer of methyl methacrylate/3-(2-methacryloxyethyl)-2,2-spirocyclohexyl oxazolidine/butyl acrylate/t-butyl amino ethyl methacrylate; and
78.2/13.8/5/2/1 five-component polymer of methyl methacrylate/3-(2-methacryloxyethyl) - 2,2-spirocyclohexyl oxazolidine/butyl acrylate/glycidyl methacrylate/t-butyl amino ethyl methacrylate.

The term copolymer is used herein to designate multi-component polymers which include any combination of the various monomeric units, e.g., terpolymers, 4-component polymers, 5-component polymers, etc. Thus copolymers of the adhesion-promoting acrylic polymers would include any polymers containing two or more of the required monomeric units, such as methyl methacrylate, 3-(2-methacryloxyethyl) - 2,2-spirocyclohexyl oxazolidine and t-butyl amino ethyl methacrylate.

Other monomers can be substituted for some or all of the methyl methacrylate in the above examples. These monomers include esters of acrylic acid or methacrylic acid with alcohols having from 1 to 18 carbon atoms such as methyl acrylate or methacrylate, ethyl acrylate or methacrylate, propyl acrylate or methacrylate, isopropyl acrylate or methacrylate, the various butyl acrylates or methacrylates, cyclohexyl acrylate or methacrylate, benzyl acrylate or methacrylate, phenyl acrylate or methacrylate, n-hexyl, n-octyl, t-octyl, dodecyl, hexadecyl, or octadecyl acrylates or methacrylates, acrylonitrile, methacrylonitrile, acrylamide, methacrylamid, styrene, α-methyl styrene, vinyl toluenes, acrylic acid, acrylic acid anhydride, methacrylic acid anhydride, maleic anhydride, fumaric acid, crotonic acid, allyl acetate, glycidyl methacrylate, t-butylaminoethyl methacrylate, hydroxyalkyl acrylates and methacrylats such as β-hydoxyethyl methacrylate, β-hydroxyethyl vinyl ether, β-hydroxyethyl vinyl sulfide, vinyl pyrrolidone, and N,N-dimethylaminoethyl methacrylate.

The adhesion-promoting properties of the polymers listed above are supplied by the following monomeric units:

Hydroxy amino propyl methacrylate

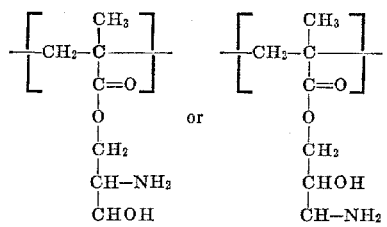

3-(2-methacryloxyethyl-2,2-spirocyclohexyl oxazolidine

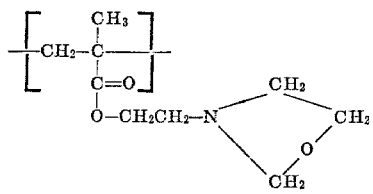

3-amino 3-hydroxy propyl methacrylate

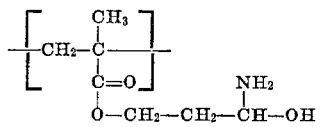

Diethyl amino ethyl methacrylate

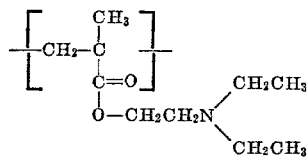

Dimethyl amino ethyl methacrylate

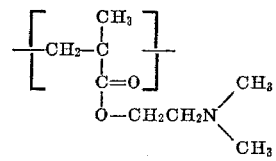

Amino ethyl vinyl ether

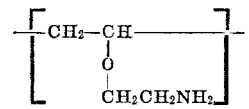

2-amino propyl methacrylate

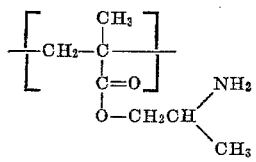

2-amino ethyl methacrylate

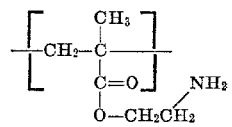

t-Butyl amino ethyl methacrylate

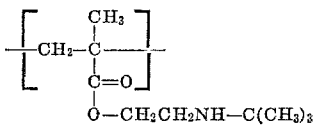

2-(1-aziridinyl)-ethyl methacrylate

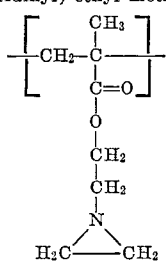

N-2-hydroxy propyl methacrylamide

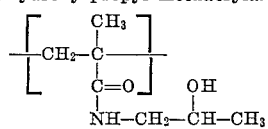

N-2-hydroxy ethyl methacrylamide

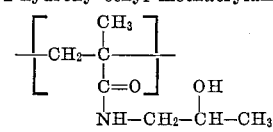

Most of the adhesion-promoting monomers are available commercially. The adhesion-promoting acrylic polymers can be prepared by directly copolymerizing these monomers with an acrylic monomer such as methyl methacrylate by techniques well known in the art.

The preparation of hydroxy amino propyl methacrylate is disclosed in U.S. Patents 2,949,383 and 2,949,445, herein expressly incorporated by reference.

3-amino 3-hydroxy propyl methacrylate is prepared by reacting methacrylic acid with 2(1-aziridinyl) ethanol.

2-amino propyl methacrylate and 2-amino ethyl methacrylate are prepared by reacting methacrylic acid with ethylene imine and propylene imine respectively.

The molecular weights of the adhesion-promoting acrylic polymers in general range from about 30,000 to about 150,000. The preferred range is 50,000 to 75,000 because they have good viscosity properties in this range.

The preferred acrylic polymer is a 95/5 copolymer of methyl methacrylate and 3-(2-methacryloxyethyl)-2,2-spirocyclohexyl oxazolidine. This copolymer is preferred because it is commercially available, economical, and results in a high level of adhesion in the sealer composition.

A second preferred acrylic polymer is a 84/15/1 three-component polymer of methyl methacrylate/3-(2-methacryloxyethyl) - 2,2 - spirocyclohexyl oxazolidine/t-butyl amino ethyl methacrylate. This particular acrylic polymer is preferred because it results in sealer compositions having highly uniform adhesion characteristics. Moreover, sealer compositions prepared from this polymer form clear, noncloudy films which are evidence of unusually good compatibility between the epoxy and acrylic components.

Solvents preferred for this invention are glycol ethers such as ethylene glycol monoethyl ether, ethylene glycol monoethyl ether acetate, ethylene glycol monomethyl ether, etc. In addition, other organic solvents can be used in combination with these preferred solvents including: aromatic hydrocarbons such as toluene, xylene, substituted benzenes, and other analogues; alcohols such as methanol, ethanol, propanol and butanol; ketones such as methly ethyl ketone, acetone, diethyl ketone and methyl isobutyl ketone. Methyl ethyl ketone with about 2% water also can be used.

The preferred embodiment of this invention is a sealer composition comprising a polymeric binder of:

(A) about 81 parts of epichlorohydrinbisphenol A with a molecular weight of about 200,000; and (B) about 19 parts of a 95/5 copolymer of methyl methacrylate/3 - (2-methacryloxyethyl)-2,2-spirocyclohexyl oxazolidine, dissolved in a solvent combination of ethylene glycol monoethyl ether, methyl ethyl ketone, toluene and acetone. The sum of the (A) and (B) components, of course, equals 100 parts.

Another preferred embodiment of this invention is a sealer composition comprising a polymeric binder of:

(A) about 70 parts of epichlorohydrin-bisphenol A having a molecular weight of about 200,000; and (B) about 30 parts of an 84/15/1 terpolymer of methyl methacrylate/3 - (2-methacrylyloxyethyl)-2,2-spirocyclohexyl oxazolidine/t-butyl amino ethyl methacrylate, dissolved in a solvent combination of ethylene glycol monoethyl ether, methyl ethyl ketone, toluene and acetone.

The sealer compositions of this invention can contain other additives such as pigments, plasticizers, surfactants, diluents, etc. Pigmentation of up to about 30% pigment volume concentration is often desirable. Suitable examples of pigments include titanium dioxide, aluminum silicate, talc, carbon black, zinc, barium or strontium chromates, calcium carbonate, etc.

Plasticizers such as butyl benyl phthalate can be added to improve flexibility. Examples of diluent resins suitable for use in these compositions are low molecular weight epoxies, short oil epoxy esters, non-adhesion-promoting acrylics, polystyrenes, vinyl polymers, etc. Diluent liquids such as toluene, xylene, acetone, etc., can also be used.

EXAMPLE I-A

An automobile sealer for the bonding together of an automotive acrylic lacquer topcoat to a high bake alkyd, epoxy and/or epoxy ester primer is made as follows:

Formula 1

| Mill base: | Parts |
|---|---|
| Aluminum silicate | 19.49 |
| Carbon black | 0.78 |
| Titanium dioxide | 19.61 |
| Copolymer of methyl methacrylate and 3-(2-methacryloxyethyl) - 2, 2 - spirocyclohexyl oxazolidine 95/5, 40% solids in a 3/1 toluene/acetone solvent | 17.45 |
| Ethylene glycol monoethyl ether | 23.59 |
| Total | 80.92 |

The above composition is premixed and run through a sand mill to a fineness of 0.5 mil.

Formula 2

| | Parts |
|---|---|
| Formula 1 | 80.92 |
| Copolymer of methylene methacrylate and 3-(2-methacryloxyethyl)-2, 2-spirocyclohexyl oxazolidine 95/5, 40% solids in a 67/33 toluene/acetone | 52.30 |
| Ethylene glycol monoethyl ether | 127.08 |
| Acetone | 151.20 |
| Toluene | 64.19 |
| 200,000 molecular weight epichlorohydrin-bisphenol A polymer, 40% solids in methyl ethyl ketone | 300.31 |
| Total | 776.00 |

Formula 2 is then reduced to spray for conventional air spray equipment, manual or automatic, with a 200% by volume add of a solvent composed of 72% acetone and 28% toluene.

Substrates are prepared by dipping 4" x 12", 20 gauge steel panels in an automotive high bake sheet metal primer (approximate composition—25% pigment volume, 94/6–50% oil length Soya alkyl/liquid epoxy resin). The primer is reduced such that 0.25 mil of primer is deposited 6" from the top of the panel after a bake of 30 minutes at 400° F.

The reduced composition of Formula 2 is spray applied to the above substrate to a film build of 0.15 to 0.25 mil. After a flash period of 1 minute, 2.5 mils of conventional acrylic lacquer topcoat is applied wet on wet and baked 30 minutes at 285° F.

These panels are then chipped in a Gravelometer and dated on a scale from 0–10. The Gravelometer and test procedures are described below. Three controls, one in which the high molecular weight epichlorohydrin-bisphenol. A polymer is replaced by the methyl methacrylate/3-(2-methacryloxyethyl)-2, 2-spirocyclohexyl oxazolidine copolymer in Formula 2, another where the methyl methacrylate/3-(2-methacryloxyethyl)-2, 2-spirocyclohexyl oxazolidine copolymer is replaced by the epichlorohydrin-bisphenol A polymer and dispersed in a ball mill and one in which no sealer coat is used. The results are:

| Sealer: | Rating |
|---|---|
| Formula 2 | 8–9 |
| No sealer | 0 |
| Sealer formulated with no methyl methacrylate and 3-(2-methacryloxyethyl)-2, 2-spirocyclohexyl oxazolidine polymer | 0 |
| Sealer formulated with no epoxy | 5–6 |

TEST PROCEDURE FOR 0° F. GRAVELOMETER CHIP TEST

The test is conducted in a 0° F. normal atmosphere. The Gravelometer consists of a device to hold a 4 in. x 12 in. test panel. A 2 in. horizontal air line fitted with a valve capable of supplying compressed air at at least 75 p.s.i. when the valve is wide open. The opened end of the air line is 8 in. from the test panel and pointed directly at it. The air line is fitted with a vertical 2 in. pipe 8 in. behind its opened end. The vertical pipe is 18 in. high with the upper end flared and fitted with a plug to accept 1 pint of gravel ⅜ in. to ⅝ in. in size.

To test the chip resistance of a system a 4 in. x 12 in. test panel is prepared. It is allowed to cool to 0° F. for a minimum of 2 hours. It is then placed in the holding device and the air valve is open to a dynamic pressure of 75 p.s.i. Then the stopper is pulled from the flared end of the vertical pipe allowing 1 pint of gravel to fall into the moving air stream. As the gravel falls into the air stream it is projected at high velocity into the test panel.

The following rating system is used to describe the result of the chip test:

0—Total failure; complete removal of the organic film
5—Minimum commercial acceptability, many chips, maximum size ¼ in.
6—Many chips, maximum size ⅛ in.
7—Moderate number of chips, maximum size ⅛ in.
8—Moderate number of chips, small topcoat ruptures
9—Few chips
10—Topcoat deformation only

EXAMPLE I-B

Results similar to those described in Example I-A are obtained following the procedure of Example I-A except that the methyl methacrylate and 3-(2-methacryloxyethyl)-2,2-spirocyclohexyl oxazolidine-95/5 polymer is replaced by a methyl methacrylate/hydroxy amino propyl methacrylate-98/2 polymer.

EXAMPLE I-C

Results similar to those described in Example I-A are obtained by following the procedure of Example I-A except that the methyl methacrylate/3-(2-methacryloxyethyl)-2,2-spirocyclohexyl oxazolidine-95/5 polymer is replaced by a methyl methacrylate/3-(2-methacryloxyethyl)-2,2-spirocyclohexyl oxazolidine-85/15 polymer.

EXAMPLE I-D

Results similar to those described in Example I-A are obtained by following the procedure of Example I-A except that the 200,000 molecular weight epichlorohydrin-bisphenol A polymer is replaced by the same polymer with a molecular weight of 60,000.

EXAMPLE I-E

Substrates are prepared by sanding 4" x 12", 20 guage automotive steel with 400 sand paper. The reduced sealer of Formula 2 is spray applied to a film build of 0.2 mil with appropriate controls and topcoated and baked as in Example I-A. The following chip results are obtained:

| Sealer: | Rating |
|---|---|
| Formula 2 | 10 |
| No sealer | 2 |
| Sealer formulated with no methyl methacrylate/ 3-(2-methacryloxyethyl) - 2,2-spirocyclohexyl oxazolidine polymer | 10 |
| Sealer formulated with no epoxy | 4 |

EXAMPLE II

Substrates are prepared by electrodepositing on 4" x 12" steel panels a malenized linseed oil sheet metal primer (approximate composition 10% pigment volume, 200 Acid Number malenized linseed oil that was neutralized with dimethylethanol amine and reduced to 10% solids in water) at 75 volts for one minute and baking 30 minutes at 390° F. The substrates were sealed and topcoated as in Example I.

The results obtained are:

| Sealer: | Rating |
|---|---|
| Formula 2 | 9 |
| No sealer | 2 |
| Sealer formulated with no copolymer of methyl methacrylate and 3 - (2 - methacryloxyethyl)-2,2-spirocyclohexyl oxazolidine 95/5 | 0 |
| Sealer formulated with no epoxy | 6 |

EXAMPLE III

Examples of clear automotive sealers are prepared as follows:

Formula 3

| | Parts |
|---|---|
| Copolymer of methyl methacrylate/3-(2-methacryloxyethyl) - 2,2 - spirocyclohexyl oxazolidine 95/5, 40% solids in a 3/1 toluene/acetone solvent | 10 |
| 200,000 molecular weight epichlorohydrin-bisphenol A polymer, 40% solids in methyl ethyl ketone | 90 |
| Total | 100 |

Formula 4

| | Parts |
|---|---|
| Copolymer of methyl methacrylate/3-(2-methacryloxyethyl) - 2,2 - spirocyclohexyl oxazolidine 95/5, 40% solids in a 67/33-toluene acetone | 40 |
| 200,000 molecular weight epichlorohydrin-bisphenol A polymer, 40% solids in methyl ethyl ketone | 60 |
| Total | 100 |

Each of the above clears can be diluted for spray with 200% addition of a 50/30/20-acetone/ethylene glycol monoethyl ether/toluene blend. Substrates are prepared as in Example I-A using a black sheet metal primer with an approximate composition of 85/8/7 Tofa alkyl/liquid epoxy/urea formaldehyde binder at 25% pigment volume and baked at 30 minutes at 425° F.

Sealers are applied to a film build of 0.5 mil and then topcoated as in Example I-A. Chipping results are as follows with appropriate controls:

| Sealer: | Rating |
|---|---|
| Formula 3 | 7 |
| Formula 4 | 7 |
| Sealer composed of just methyl methacrylate/3-(2 - methacryloxyethyl) - 2,2 - spirocyclohexyl oxazolidine 95/5 copolymer | 4 |

EXAMPLE IV

An automotive sealer is made according to the procedure of Example I except that the 95/5 copolymer of methyl methacrylate and 3 - (2 - methacryloxyethyl)-2,2-spirocyclohexyl oxazolidine is replaced by a 84/15/1 copolymer (3-component polymer) of methyl methacrylate/3-(2-methacryloxyethyl)-2,2-spirocyclohexyl oxazolidine/t-butyl amino ethyl methacrylate.

The substrates are prepared in the same manner as Example 1 and the reduced composition is applied to the substrate to a film build of about 0.5 mil. After a flush period of 1 minute, 2.0 to 2.2 mils of a conventional acrylic laquer topcoat is applied wet on wet and the substrate is baked for 30 minutes at 285° F.

The coated panels are then chipped in a Gravelometer and rated on a scale from 0–10. Chip resistance values are at least as good as those reported in Example I and in many instances are even better than those reported in Example I. In addition, films cast from the sealer composition are clear and tough rather than cloudy (which is illustrative of phase separation in the composition and is often typical in epoxy-acrylic blends). Moreover, the sealer composition exhibits an unusually high uniformity in adhesion to the automotive acrylic laquer topcoats and high bake alkyd, epoxy and/or epoxy ester primers.

EXAMPLES V–VI

The procedures of Example IV are repeated except that the 84/15/1 copolymer of Example IV is replaced with the following copolymers:

Example V.—80/14/5/1 four-component polymer of methyl methacrylate/3 - (2-methacryloxyethyl)-2,2-spirocyclohexyl oxazolidine/butyl acrylate/t-butyl amino ethyl methacrylate.

Example VI.—78.2/13.8/5/2/1 five-component polymer of methyl methacrylate/3-(2-methacryloxyethyl)-2,2-spirocyclohexyl oxazolidine/butyl acrylate/glycidyl methacrylate/t-butyl amino ethyl methacrylate.

Results similar to those obtained in Example IV are achieved.

EXAMPLE VII

The procedures of Example IV are repeated except that a low molecular weight epoxy resin ("CX–7090" available from Dow Chemical Co. and reported to have a molecular weight of about 15,000 to 20,000) is used in place of the 200,000 molecular weight epichlorohydrin-bisphenol A polymer.

The sealer compositions produced exhibit properties similar to those of Example I.

The coating compositions of this invention are useful as sealers particularly for providing adhesion between coatings such as acrylic lacquer topcoats to coatings such as alkyd resins, epoxy esters and oils which traditionally are non-adhesive to each other. These compositions are also useful for bonding topcoats or other organic films to such substrates as metal, Fiberglas, rubber, glass, wood, plastics, cotton and other fabrics, and other organic substrates. These are particularly useful for bonding acrylic automotive topcoats to high baked sheet metal primers. These are also useful for bonding decorative enamel finishes such as are found on household appliances to metal or other organic substrates. Another use is in bonding an automotive topcoat to metals, particularly bright metals such as chrome, bright aluminum and stainless steel.

What is claimed is:

1. A sealer composition which comprises a polymeric binder dissolved in an organic solvent, said polymeric binder comprising the following components:
   (A) about 50 to about 95 parts by weight of a high molecular weight epoxy resin having the structural formula

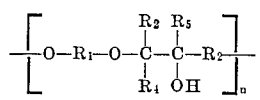

wherein $n$ is an integer sufficient to provide the epoxy resin with a molecular weight of at least about 20,000; $R_1$ is a divalent aromatic radical selected from the group of bisphenol A, substituted bisphenol A, bisphenol F and susbtituted bisphenol F; $R_2$ is a $C_1$ to $C_5$ alkyl; and $R_3$, $R_4$ and $R_5$ are individually selected from the group of hydrogen and a $C_1$ to $C_5$ alkyl; and
   (B) about 5 to 50 parts by weight of an adhesion-promoting acrylic polymer, wherein said acrylic polymer is a copolymer containing monomeric units selected from the group of hydroxy amino propyl methacrylate, 3 - (2 - methacryloxyethyl)-2,2-spirocyclohexyl oxazolidine, 3-amino 3-hydroxy propyl methacrylate, diethyl amino ethyl methacrylate, amino ethyl vinyl ether, 2-amino propyl methacrylate, 2-amino ethyl methacrylate, 2-(1-aziridinyl)-ethyl methacrylate, t-butyl amino ethyl methacrylate, dimethyl amino ethyl methacrylate, N-2-hydroxy propyl methacrylamide and N-2-hydroxy ethyl methacrylamide.

the sum of said components being equal to 100 weight parts.

2. A sealer composition of claim 1 wherein the adhesion-promoting acrylic polymer is a copolymer containing three monomeric units in which two of the monomeric units are 3-(2-methacryloxyethyl)-2,2-spirocyclohexyl oxazolidine and t-butyl aminoethyl methacrylate.

3. A sealer composition of claim 2 wherein the adhesion-promoting polymer is a coplymer formed from about 84 parts of methyl methacrylate, about 15 parts of 3-(2-methacryloxy-ethyl)-2,2-spirocyclohexyl oxazolidine and about 1 part of t-butyl amino ethyl methacrylate.

4. A sealer composition of claim 1 wherein the (A) high molecular weight epoxy resin is epichlorohydrin-bisphenol a polymer having a molecular weight of from about 20,000 to about 200,000.

5. A sealer composition of claim 4 wherein the epichlorohydrin-bisphenol A polymer is present in an amount of about 75 to about 90 parts by weight.

6. A sealer composition of claim 5 wherein the adhesion-promoting polymer is a copolymer formed from about 95 parts of methyl methacrylate and about 5 parts of 3-(2-methacryloxy-ethyl)-2,2-spirocyclohexyl oxazolidine.

7. A sealer composition of claim 6 wherein the epichlorohydrin-bisphenol A polymer has a molecular weight of about 200,000.

8. A sealer composition of claim 7 wherein the adhesion-promoting acrylic polymer is present in an amount of about 19 parts and the high molecular weight epoxy resin is present in an amount of about 81 parts, the sum being equal to 100 parts.

9. A sealer composition of claim 8 wherein the binder is dissolved in a combination of organic solvents which consists essentially of acetone, ethylene glycol monoethyl ether, toluene and methyl ethyl ketone.

10. A sealer composition of claim 9 wherein the binder is dissolved in a combination of organic solvents which consists essentially of acetone, ethylene glycol monoethyl ether, toluene, methyl ethyl ketone and isopropanol.

11. A sealer composition of claim 8 which contains pigmentation in an amount of up to about 40% pigment volume concentration.

12. A sealer composition of claim 11 wherein the total pigmentation comprises about 49% titanium dioxide, about 49% aluminum silicate and about 2% carbon black; the total pigmentation being present in an amount of about 10% pigment volume concentration.

13. A metal substrate coated with the sealer composition of claim 1.

14. An alkyd resin based primer substrate coated with the composition of claim 1.

15. An epoxy ester substrate coated with the composition of claim 1.

16. A modified oil based film substrate coated with the composition of claim 1.

17. A plastic substrate coated with the composition of claim 1.

18. A sealer composition of claim 1 wherein the (A) epoxy resin has a molecular weight of at least 15,000.

References Cited

UNITED STATES PATENTS

| | | | |
|---|---|---|---|
| 2,602,075 | 7/1952 | Carpenter. | |
| 2,949,383 | 8/1960 | Blake | 260—86.1 |
| 2,949,445 | 8/1960 | Blake | 260—86.1 |
| 3,177,089 | 3/1965 | Marshall. | |
| 3,177,090 | 4/1965 | Bayes. | |
| 3,234,313 | 2/1966 | Miller. | |
| 3,238,087 | 3/1966 | Nowalk. | |
| 3,287,205 | 11/1966 | Metuchen | 260—837 |
| 3,297,784 | 1/1967 | Snedeker et al. | 260—837 |
| 3,308,205 | 3/1967 | Bugel | 260—837 |

MORRIS LIEBMAN, Primary Examiner

L. T. JACOBS, Assistant Examiner

U.S. Cl. X.R.

260—33.2, 33.4, 33.6, 37, 837; 117—132, 138.8

UNITED STATES PATENT OFFICE
CERTIFICATE OF CORRECTION

Patent No. 3,509,086      Dated April 28, 1970

Inventor(s) Frank Rohrbacher, Jr.

It is certified that error appears in the above-identified patent and that said Letters Patent are hereby corrected as shown below:

Claim 1, column 9, that portion of the structural formula reading $$\begin{array}{c} R_2 \\ | \\ C \\ | \\ R_4 \end{array} \quad \text{should read} \quad \begin{array}{c} R_3 \\ | \\ C \\ | \\ R_4 \end{array}$$

SIGNED AND SEALED
SEP 15 1970

(SEAL)
Attest:

Edward M. Fletcher, Jr.
Attesting Officer

WILLIAM E. SCHUYLER, JR.
Commissioner of Patents